United States Patent [19]

Yahraus

[11] Patent Number: 4,818,822

[45] Date of Patent: Apr. 4, 1989

[54] JUNCTION BOX

[76] Inventor: Norman J. Yahraus, 2240 Lindell Rd., Las Vegas, Nev. 89102

[21] Appl. No.: 116,904

[22] Filed: Nov. 4, 1987

[51] Int. Cl.[4] .............................................. H02G 3/08
[52] U.S. Cl. .................................. 174/53; 174/65 R; 220/3.94; 220/4 E
[58] Field of Search ......................... 174/53, 65 R, 92; 220/3.92, 3.94, 4 E; 200/297, 303

[56] References Cited

U.S. PATENT DOCUMENTS

| | | | |
|---|---|---|---|
| 2,268,090 | 12/1941 | Windsor | 173/334 |
| 2,659,765 | 11/1953 | Dunn | 174/65 |
| 3,112,148 | 11/1963 | Wochner | 339/116 |
| 3,147,338 | 9/1964 | Ekvall et al. | 174/138 |
| 3,168,613 | 2/1965 | Palmer | 174/65 |
| 3,223,776 | 12/1965 | Piasecki | 174/138 |
| 4,051,322 | 9/1977 | Park et al. | 174/65 |
| 4,117,259 | 9/1978 | Giebel et al. | 174/92 |
| 4,219,693 | 8/1980 | French | 174/135 |

Primary Examiner—Arthur T. Grimley
Assistant Examiner—David A. Tone
Attorney, Agent, or Firm—Bernard L. Howard; Richard G. Harrer

[57] ABSTRACT

A junction box readily adapted for installation to an electric power cable made up of a pair of identical interlocking sections which are joined together over the cable at any appropriate point on the cable. In one embodiment the box is employed as a "stringer" box where a series of the boxes are installed on a single power cable. In such embodiment, hollow projections are provided at each end of the box for entry and exit of the power cable, the projections being formed by the pairing of clamping members in the end walls of the interlocking sections. Through the use of special reinforcing, the junction box is light in weight but can withstand heavy abuse.

9 Claims, 2 Drawing Sheets

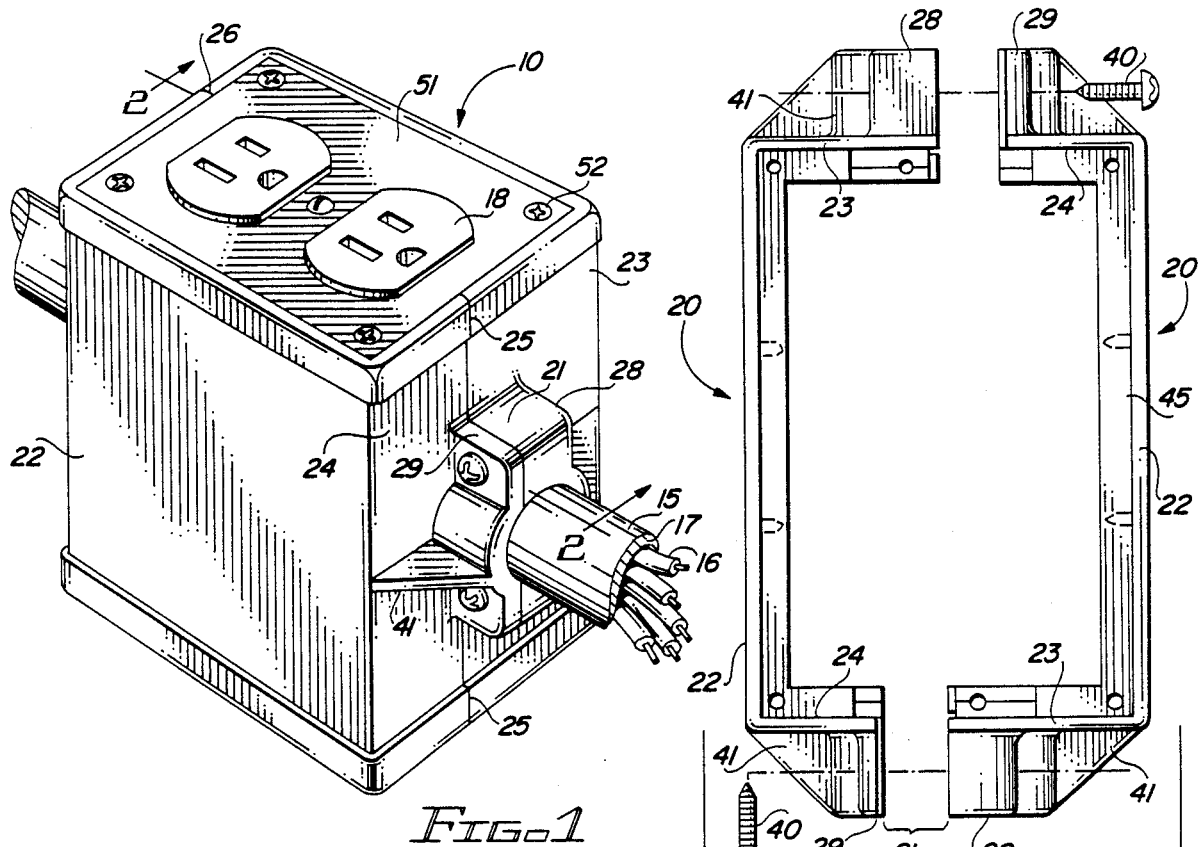
Fig. 1
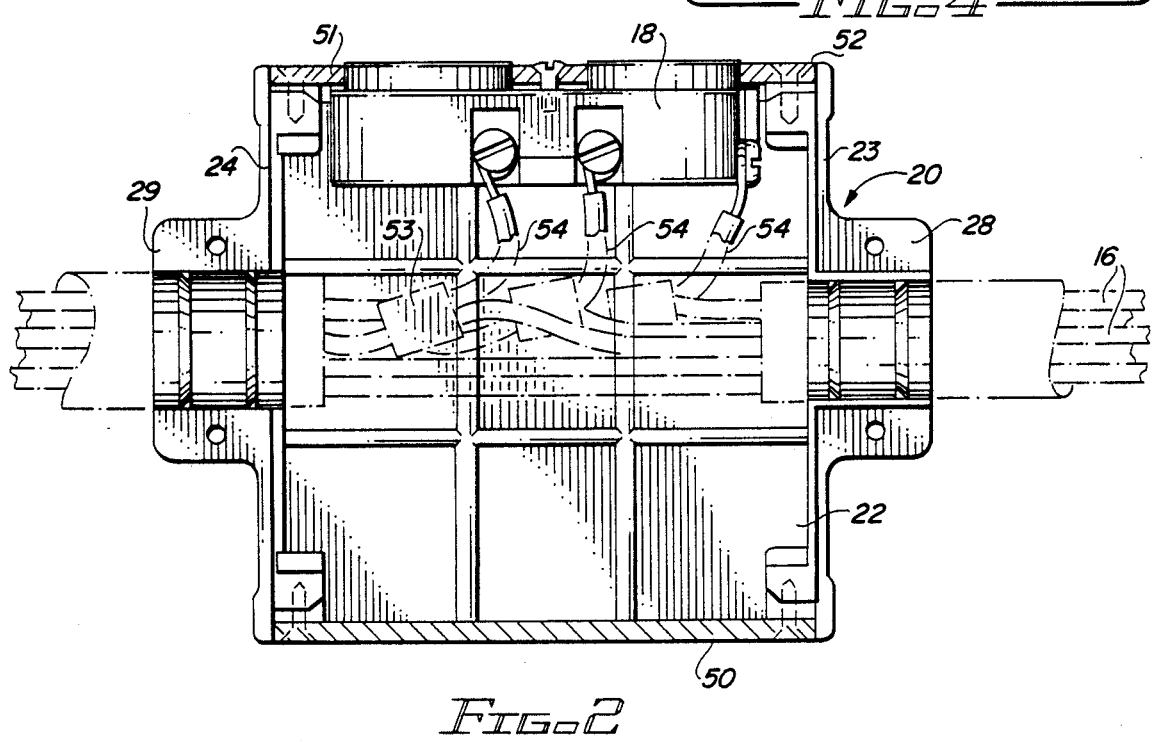
Fig. 4
Fig. 2

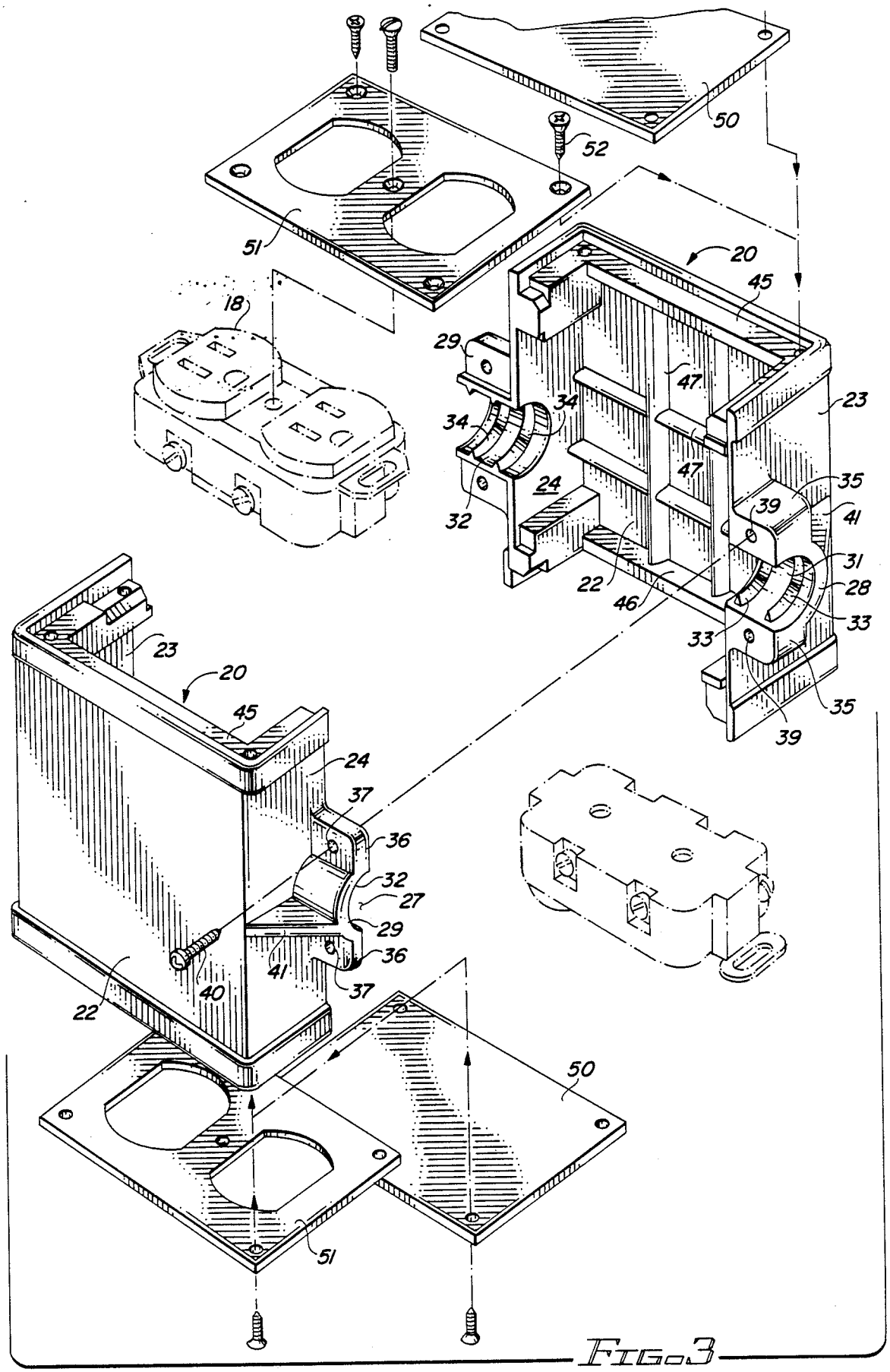

JUNCTION BOX

FIELD OF THE INVENTION

This invention relates to junction boxes adapted for use in connecting into electric power cables without severing the conductors enclosed within the cable. Particularly, this invention relates to a junction box which is easily mounted to a power cable and which has mounted therein one or more power receptacles or switches for providing electric power for lighting and/or electrical apparatus.

BACKGROUND OF THE INVENTION

For many years, trade shows and exhibitions have used what are termed "Windsor" or "stringer" boxes to help deliver electric power to the myriad of booths which are to be found at such shows and exhibits. A Windsor box can be described as a one-piece molded rubber junction box having thick walls with opposite ends of the box provided with hollow, nipple-like rubber extensions to receive the main power cable and with openings on opposed sides of the box to receive conventional electrical receptacles, switches and the like. A series of such Windsor boxes is usually mounted on a single power cable, each for delivery of power to one or more booths. The wiring of even a single Windsor box to a power cable is both difficult and very time consuming, it being estimated that the labor time to attach a single stringer box can range from forty-five minutes to one hour and fifteen minutes. This is so because the power cable must be pulled, usually with considerable difficulty, through the nipple-like extension at one end of the box, through the box and then through and out the opening at the opposite end of the box. Thereafter the electrician must pull some of the cable from the box so that can work outside of the box on that area of the power cable where connections to receptacles and the like are to be made. After connections are completed, the slack in the cable must be taken up and the receptacles secured to appropriate openings in the box.

A stringer box is necessarily subjected to considerable abuse when one considers the environment in which such boxes are used. The boxes as strung on a power cable lay on the floor during the exhibition or trade show and at times are run over by heavy equipment which is used in connection with such exhibit or trade show. Removal of a damaged box becomes exceedingly difficult when one considers that the cable must be pulled from within the damaged box and if the damaged box is not at the end of the cable, other boxes need to be removed before the damaged box is available for replacement.

SUMMARY OF THE INVENTION

This invention provides a junction or stringer box readily adapted to be installed on an electrical power cable and which comprises interlocking box sections which may be joined together over the cable at any appropriate point to enclose the cable connections or in line taps and to securely clamp the junction box to the cable. The box when constructed to be used as a stringer box is made up of two identical sections and thus only a single cavity mold is needed to manufacture the box sections. The preferred material from which the box is made is an electrically non-conductive material such as PVC, ABS or a bisphenol A polycarbonate polymer, commercially available under the trademarks Lexan and Merlon. The polycarbonate polymer is preferred. Although the box is quite lightweight when compared to the aforementioned Windsor box, it is incredibly strong. Tests have shown that the assembled box of this invention will withstand up to 10,000 pounds per square inch pressure in any direction, the standard for such a box being about 2500 pounds per square inch. Although the box when constructed to be used as a stringer box consists of two sections which are mirror images of each other, the sections are not the result of merely taking a rectangular box and sectioning it precisely down the center. Where the box is joined together, which is customarily done by self-tapping screws, certain areas of the walls of the two halves of the box are bigger to provide sufficient material so that the self-tapping screws can be used to join the two halves together.

Moreover, although the walls of the box can be relatively thin (about ⅛ of an inch) the side walls are provided with ribs and flanges that are molded into the sections and these ribs and flanges contribute substantially to the overall strength of the box.

A further feature of the box is provided at the area of the box where the power cable enters and exits. This area is provided with transverse ribs which function not only to strengthen this area of the box but serve to grip the cable so that the box will not move or slide once it is properly positioned and the two sections of the box are securely joined together.

DESCRIPTION OF THE DRAWINGS

Turning now to the drawings in which the presently preferred embodiments of the invention are illustrated and from which further features and advantages will appear:

FIG. 1 is a perspective view of the box including a five conductor wire cable entering and exiting the box;

FIG. 2 is a sectional view taken along the line 2—2 of FIG. 1;

FIG. 3 is a perspective view of the junction box of FIG. 1 with the two sections of the box being separated to show the construction details;

FIG. 4 is a top plan view showing the two sections of the junction box.

DETAILED DESCRIPTION OF THE INVENTION

Referring to the drawings, the numeral 10 of FIG. 1 denotes an assembled junction box useful as a "stringer" box with a sheathed power cable passing through the box and a two-outlet receptacle mounted on the top side of the box. As shown most clearly in FIGS. 3 and 4, the box is formed of two identical sections shown generally at 20 which are preferably molded from a thermoplastic resin such as ABS, PVC or a bisphenol A polycarbonate polymer which is commercially available under the trademarks Lexan and Merlon. The polycarbonate polymer is preferred. Sections 20 are brought together in abuttment to form two side walls and two end walls of the box. Assembly of sections 20 leaves each of the top and bottom sides of the box open which openings are adapted to receive a cover plate 50, or, an outlet receptacle 18, switch, or other electrical device. When assembled, the box is provided with a pair of aligned projections 21 which extend outwardly from the end walls thereof. Projections 21 are provided with generally cylindrical conductor or cable openings 27. As shown best in FIG. 1, in assembled form the lines of demarcation or joints 25 and 26 between sections 20 passes through the projections 21 on opposite end walls of the box. If a plane is passed through the longitudinal axis of the box perpendicular to its bottom side, although such plane will pass through the center of the generally cylindrical shaped cable openings, the plane will not pass through any portion of the joints 25 and 26 formed by the mating edges of sections 20. This is important as will be explained later on.

Each of sections 20 comprises a rectangular shaped side wall 22 and end walls 23 and 24 which are perpendicular to side walls 22. As shown best in FIGS. 3 and 4 end wall 24 is shorter than end wall 23. Thus, when sections 20 are assembled as shown in FIG. 1, the joints 25 and 26 formed by the mating edges of walls 23 and 24 will not coincide with a plane passed through the longitudinal axis of the box perpendicular to the bottom side thereof.

As previously noted the assembled box is provided with a pair of projections 21 having generally cylindrical shaped conductor or cable openings 27. The dimensions of the entrances may be varied to suit the size of the power cable. Projections 21 are formed by bringing together clamping members 28 and 29 which are integral with and extend a distance from end walls 23 and 24 respectively. Each of clamping members 28 and 29 has curved interior walls 31 and 32 with each of the walls being provided with linear projections or ribs 33 and 34 which serve both to strenghthen the clamping members and ultimately projection 21 and to securely grip the cable 15 when the box is assembled about the cable. Ribs 33 and 34 are positioned transverse of the long axis of the box 10 and are preferably provided with a knifelike edge to more securely grip the cable.

Clamping members 28 and 29 have integral shoulders 35 and 36. Shoulder 36 is provided with holes 37 to receive a fastening screw 40 and shoulders 35 have holes 39 adapted to receive screw 40. Because shoulders 35 are considerably thicker than shoulders 36, much greater strength is provided to projections 21 enabling the projections to resist abuse which can occur when the boxes are in use. Moreover, by providing thicker shoulders 35 in clamping member 28, securing sections 20 together is facilitated in that self-tapping screws can be used rather than machine screws and nuts. Shoulders 35 are of sufficient thickness so that when sections 20 are fastened together, the screw will be entirely recessed within shoulders 35 and 36 except for the screw head. To further enhance the structural integrity of projections 21, a triangular shaped reinforcing member or gusset 41 is provided between end walls 23 and 24 and each of clamping members 28 and 29.

As best shown in FIG. 3, each of sections 20 is further structurally reinforced by means of flanges and ribs. A protruding flange is provided at both the top and bottom edges of sections 20. As shown, it is preferred that such flanges 45 and 46 be positioned below the top and bottom edges of sections 20 a short distance so as to provide a recessed area to receive the removable cover plate 50 or outlet plate 51. Flanges 45 and 46 extend along side wall 22 and end walls 23 and 24. Preferably, the flanges are considerably thicker on end walls 23 and 24 for receiving flat head sheet metal or self-tapping screws 52 to secure a blank cover plate or outlet plate to the assembled box, to receive fasteners to secure electrical receptacle 18 in the box, and to provide still additional reinforcement. In addition to flanges 45 and 46 the side walls 22 of sections 20 are further reinforced by means of a series of ribs 47. As shown in FIG. 3, two spaced apart vertically positioned ribs and two spaced apart horizontally positioned ribs are molded integral with side walls 22. By providing sections 20 with this flanged and ribbed construction, the side and end walls may be made considerably thinner, which conserves materials, and with improved structural integrity.

Additionally, to assist in lining up sections 20 when assembling box 10 it is preferred that the joint formed by the mating edges of sections 20 be an interlocking lap joint as shown in FIG. 3 or even a tongue and groove joint.

The junction box of this invention has particular application in temporary electrical installations such as required for trade shows and the like. In such usage, for example, a five conductor cable is usually placed adjacent the various booths that are part of the show. To supply electrical power to each of the booths, the electrician merely removes a portion of the sheathing 17 on the cable at the point where the junction box is to be installed. The necessary conductors in the cable are prepared for an in line tap or, a compression connector 53 can be employed to electrically connect the wires in the cable set to the particular electrical device to be used in the box. As shown in the assembled box in FIG. 1 and in section in FIG. 2, a two outlet receptacle 18 has been installed in the box and connected by means of wires 54 and compression connectors 53 to three of the conductors 16 of the five conductor cable. Thereafter, the two sections 20 of the box are placed over the cable to enclose the area and secure the box to the cable. The two outlet receptacle is secured to the end walls of sections 20 by means of screws and the two sections of the box are then secured together by means of screws 40. Since in this particular example the use of only one receptacle is shown, a blank cover plate 50 is used to enclose the bottom side of the box.

It will also be appreciated that the junction box of this invention, although very useful as a "stringer" box, can also be used as a portable junction box much in the same manner as the box shown in U.S. Pat. No. 2,268,090 to Windsor. For such application, only a single projection 21 is required at one end of the box. The junction box of this invention is electrically connected to a power supply line and then provided with the appropriate switches and/or outlets and the junction box can then be readily transported or located to supply electric power for portable tools or apparatus or any other need as may be required. It will be apparent that this invention effects a considerable savings in both manufacture and particularly in installation and repair.

I claim:

1. An electrical junction box of generally rectangular shape having opposed side and end walls, an open top and bottom side, with at least one end wall thereof provided with a projection extending outwardly from said end wall and having an opening to the interior of said box to accommodate a power cable comprising in combination:

a pair of interlocking sections each of which includes a side wall, a pair of opposed end walls perpendicular to said side wall with one of said end walls being shorter in length than the other opposed end wall;

a clamping member formed in the shorter end wall of one section and in the longer end wall of the other section, each of said clamping members being integral with and extending a distance from the exterior sides of said section end walls and each having curved interior walls;

said sections being assembled together to form said box by joining the shorter end wall of one section with the longer end wall of the other section with said clamping members joined to form said projection;

said assembled box being such that if a plane is passed through the longitudinal axis thereof and perpendicular to a bottom side, said plane will not coincide with the joints formed by assembly of said sections;

said open top and bottom sides being adapted to receive an electrical device to be connected to a power cable.

2. The electrical junction box of claim 1 wherein said sections are identical and wherein each of said end walls is provided with said projection and wherein the opposed end walls of each of said sections is provided with said clamping member.

3. The electrical junction box of claims 1 or 2 wherein the curved wall of each clamping member is provided with ribs positioned transverse of the long axis of said box.

4. The electrical junction box of claim 3 wherein the clamping members paired to form said projection are each provided with shoulders to receive fastening means, with the shoulders on one of said clamping members being thicker than the shoulders on the other of said clamping members.

5. The electrical junction box of claim 4 wherein the side walls of said sections are provided with spaced apart reinforcing ribs and wherein a protruding flange is provided at the top and bottom edges of said sections.

6. The electrical junction box of claim 3 wherein a plane passed through the longitudinal axis thereof and perpendicular to a bottom side will pass through the center of the opening of said projection.

7. The electrical junction box of claim 6 formed of an electrically non-conductive material.

8. The electrical junction box of claim 7 wherein said material is a bisphenol A polycarbonate polymer.

9. An electrical junction box of generally rectangular shape having opposed side and end walls, an open top and bottom side, with each of said end walls provided with a projection formed by a pair of clamping members, said projection extending outwardly from said end wall and having an opening to the interior of said box to accommodate a power cable comprising in combination:

a pair of identical sections each of which includes a side wall, a pair of opposed end walls perpendicular to said side wall with one of said end walls being shorter in length than the other opposed end wall, each of said sections being provided with a protruding flange at the top and bottom edges thereof and spaced apart reinforcing ribs in each side wall of said section;

a clamping member formed in the shorter and longer end wall of each section, each of said clamping members being integral with and extending a distance from the exterior sides of said section end walls and each having curved walls provided with ribs positioned transverse of the long axis of said box, and wherein the clamping member paired to form said projections are each provided with shoulders to receive fastening means, with the shoulders on one of said paired clamping members being thicker than the shoulders on the other of said clamping members;

said sections being assembled together to form said box by joining the shorter end wall of one section with the longer end wall of the other section with said clamping members joined to form said projection; said assembled box being such that if a plane is passed through the longitudinal axis thereof and perpendicular to a bottom side said plane will pass through the center of the openings of said projections and will not coincide with the joints formed by the assembly of said sections; said open top and bottom sides being adapted to receive an electrical device to be connected to a power cable.

* * * * *